United States Patent [19]

Tangorra

[11] 3,996,986
[45] Dec. 14, 1976

[54] PNEUMATIC TIRES FOR VEHICLE WHEELS

[75] Inventor: Giorgio Tangorra, Monza (Milan), Italy

[73] Assignee: Industrie Pirelli S.p.A., Milan, Italy

[22] Filed: Apr. 22, 1974

[21] Appl. No.: 463,069

[30] Foreign Application Priority Data

Apr. 26, 1973  Italy ................................ 23423/73

[52] U.S. Cl. .................... 152/353 C; 152/209 WT; 152/361 R
[51] Int. Cl.² .................... B60C 13/00; B60C 9/18; B60C 9/02
[58] Field of Search ....... 152/352, 353 C, 209 WT, 152/166, 361 R

[56] References Cited
UNITED STATES PATENTS

| | | | |
|---|---|---|---|
| 1,189,223 | 7/1916 | Albrecht | 152/209 WT |
| 1,337,660 | 4/1920 | Killen | 152/353 C |
| 1,862,269 | 6/1932 | Johnson | 152/353 C |
| 2,477,754 | 8/1949 | Kraft | 152/166 |
| 3,450,182 | 6/1969 | Verdier | 152/352 |
| 3,805,868 | 4/1974 | Tangorra | 152/353 C |

Primary Examiner—Drayton E. Hoffman
Attorney, Agent, or Firm—Stevens, Davis, Miller & Mosher

[57] ABSTRACT

A pneumatic tire for vehicle wheels is disclosed having an annular substantially inextensible reinforcing structure in the tread and sidewalls which are convexly curved towards the midplane of the tire so that the sidewalls will be placed under compression, wherein the lateral edges of the annular structure extend axially outward with respect to the connection zone between the tread and the sidewalls.

6 Claims, 1 Drawing Figure

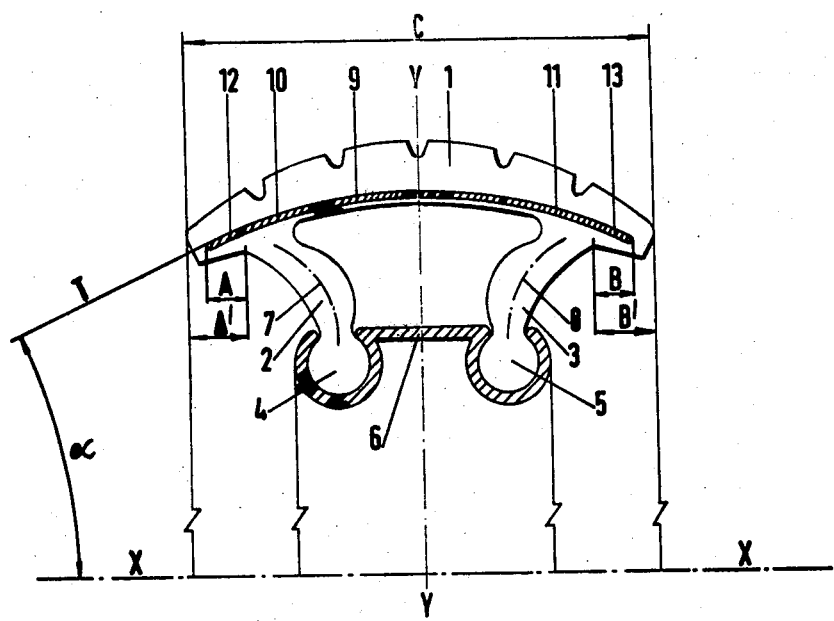

PNEUMATIC TIRES FOR VEHICLE WHEELS

The present invention relates to pneumatic tires for vehicle wheels and more precisely to the annular reinforcing structure arranged in a radially inner position with respect to tread, which is described in the copending application Ser. No. 273,337 filed July 19, 1972 now U.S. Pat. No. 3,805,868 granted Apr. 23, 1974.

As described in that application, the annular reinforcing structure is generally constituted by a plurality of superimposed layers of rubberized cords, the cords of each layer being parallel to one another and crossing the cords of the other layers.

The cords of each layer can be formed of various materials, e.g., textile materials, metallic materials, or materials of another nature; they can be combined with analogous types of cords forming the other layers, or with cords of different type according to the purposes one wishes to obtain.

It is known that the annular reinforcing structure plays an important role in the general behavior of the tire in use; in fact, it can have a remarkable influence on several working characteristics, such as tread wear, adherence to the ground, road traction, resistance to lateral thrusts, comfort and the like.

In fact, even though that part of the tire which comes into contact with the ground is the tread, it is however the annualr reinforcing structure which withstands the inflation pressure and controls the deformations of the tire under the stresses occurring in use.

The copending application Ser. No. 273,337 describes a tire wherein the section midline of the sidewalls has its convexity directed towards the inside of the tire itself and wherein the sidewalls work prevailingly under compression or under combined bending-/compression during service conditions.

As described in that application, whose disclosure is incorporated by reference herein, a tire of this type displays working characteristics quite different from those of known conventional tires whose sidewalls work under tension or combined bending/tension during service conditions.

When a tire of the kind described in the copending application is inflated, a thrust is exerted on the lateral ends of the annular reinforcing structure, tending to deform the original tread profile. Therefore, the variation of the profile of the tire with respect to that designed for it, occasions a worsening of the behavior characteristics of the tire itself.

The present invention aims to provide a pneumatic tire in which the annular reinforcing structure, incorporated in the tread, may withstand the deformations caused by the compression stresses exerted by the sidewalls, and therefore to obtain a tire having improved behavior characteristics.

Accordingly, the object of the present invention is a pneumatic tire for vehicle wheels which comprises a tread, an annular reinforcing structure incorporated in the tread, two sidewalls comprising elastomeric material and terminating into beads intended to be encased in appropriate seats of the wheel rim, the sidewalls having in the sections of each plane containing the axis of rotation of the tire a section midline whose convexity is directed towards the tire inside, said convexity being unchanged in sense under the thrust of the inflation pressure in normal working conditions, the annular reinforcing structure being substantially inextensible and defining contours, in proximity of the zone at which the tread is connected to the sidewalls, whose points are at a substantially invariable distance, with respect to pressure variations, from the points defined by the beads in the same section plates, wherein the lateral edges of the annular structure incorporated in the tread extend axially outwardly with respect to the connection zone between the tread and the sidewalls. The reinforced tread has a width greater than any other part of the tire and contains the annular structure which extends to at least the midline of the sidewalls. The sidewalls have a bending stiffness, curvature and thickness sufficient to constrain the sidewall between the side edges of the tread reinforcement and the bead seat on the wheel rim.

The main advantage of the pneumatic tire according to the present invention resides in the fact that, by axially extending the lateral edges of the annular reinforcing structure outwardly with respect to the connection zone between the tread and the sidewalls, the latter are prevented from exerting their "prop" strain on the lateral ends of the reinforcing structure, which, as known, are less suitable to withstand stresses of this kind. In this way, the reinforcing structure is better able to withstand the deformations originated by the "prop" strain exerted by the sidewalls and consequently to keep its original profile substantially unchanged, with an evident advantage on the behavior of the tire during use.

A further advantage is that the smaller deformations of the annular structure result into corresponding smaller deformations of the tread profile, so that it is also possible to reduce the tread wear and to ensure a better adherence of the tire to the ground.

Accordingly to a preferred embodiment, the lateral edges of the annular structure incorporated in the tread extend axially outwardly with respect to the axially outermost zone of connection between the tread and the sidewalls for a length of at least 2% of the maximum axial width of the tire.

Preferably, the lateral edges of the annular structure incorporated in the tread extend axially outwardly with respect to the axially outermost zone connection between the tread and the sidewalls for a length between 5% and 20% of the maximum axial width of the tire.

According to a further preferred embodiment, the tangent to the lateral edges of the annular structure forms an angle no greater than 60° with respect to the axis of rotation of the tire.

Preferably, the tangent to the lateral edges of the annular structure is parallel to the axis of rotation of the tire.

The invention will now be better illustrated with reference to the attached drawing, in which, by way of example:

the FIGURE represents the cross section of a tire according to the present invention, inflated to its service pressure.

The tire shown in the FIGURE comprises a tread 1, two sidewalls 2 and 3, two beads 4 and 5 encased into appropriate seats of a rim 6.

Sidewalls 2 and 3 have their section midlines 7 and 8 with their convexity directed towards the tire inside and, as described in Ser. No. 273,337, this convexity does not change in sense under the thrust of the inflation pressure, so that the sidewalls, in normal service conditions, work prevailingly under compression rather than under tension.

An annular reinforcing structure 9 is arranged in a radially inner position with respect to the tread 1; the structure is radially flexible but is substantially inextensible both in the axial and in the circumferential direction when it is simultaneously stressed in both directions by the inflation pressure.

The structure is formed by several layers of textile or metallic cords parallel to one another in each layer and crossing those of the adjacent layer; it extends axially for the whole upper portion of the tire, and concerns, in addition to the zones 10 and 11 of connection between the tread 1 and the sidewalls 2 and 3, the zones 12 and 13 which extend axially outwardly with respect to the connection zones.

Consequently the tread 1 incorporating the annular structure 9 also extends axially outwardly with respect to the zones 10 and 11 of connection with the sidewalls.

Each lateral edge A and B of the annular structure which concerns each zone 12 and 13, axially outer with respect to the connection zones, represents 10% of the maximum axial width C of the tire.

Each lateral edge A' an B' of the tread, which surrounds each lateral edge of the annular structure, is 13% of the maximum axial width C of the tire.

For a width $C = 180$ mm, the portions A and B, equal to each other, are 18 mm, while portions A' and B' are 23 mm.

As illustrated in the FIGURE, the profile of the annular reinforcing structure 9 has a curvature whose concavity is directed towards the tire inside for its whole axial extension.

The tire may also have a profile which has a curvature whose concavity is directed towards the tire inside only at the central portion of the tire, while at the two lateral portions, in proximity of the zones of connection of the sidewalls to the tread, the profile can have a curvature having its concavity directed towards the tire outside.

In the first case the tangent T drawn at the lateral edges of the annular structure 9 forms an angle no greater than 60° with respect to the axis of rotation XX of the tire.

In the second case the tangent T can form an angle no greater than 30° with respect to the same axis of rotation XX of the tire; the tangent can even be parrallel to the axis of rotation.

It is understood that the above reported examples are not limiting and the scope of the present invention includes any alternative embodiment deriving from the above indicated inventive concept falling within the scope of the appended claims.

What is claimed is:

1. A pneumatic tire for vehicle wheels comprising
a tread and two sidewalls comprising elastomeric material extending from the tread and terminating in beads for a rigid wheel rim,
said tread having lateral edges which extend axially outwardly as annular flanges beyond the connection zones between the tread and the sidewalls, said flanged tread being wider than any other part of the tire, said tread at said connection zones and at said lateral edges being detached from the ground when the tire is in normal service conditions,
an annular structure reinforcing said tread over substantially the whole of the width of the tread, said reinforcing structure being substantially inextensible under tire inflation pressure in both its circumferential and lateral directions, said annular structure extending into a substantial portion of said flanges,
said sidewalls having a cross-sectional shape whose midline over substantially the whole length between the side edges of the tread reinforcement and the bead is convex with respect to the interior to the tire under tire inflation pressure, each of said sidewalls having in combination a bending stiffness, curvature and thickness sufficient to constrain the sidewall between said edges of the inextensible tread reinforcement and the bead seat on the wheel rim whereby on inflation of the tire and under service conditions, the sidewalls are placed under compressive stress.

2. The pneumatic tire of claim 1 wherein said lateral edges extend axially outward for a length at least 2% of the maximum axial width of said tire.

3. The pneumatic tire of claim 1 wherein said lateral edges extend axially outward for a length of from 5–20% of the maximum axial width of said tire.

4. The pneumatic tire of claim 1 wherein the tangent to said lateral edges of said annular structure forms an angle no greater than 60° with respect to the axis of rotation of the tire.

5. The pneumatic tire of claim 1 wherein the tangent to said lateral edges of said annular structure is parallel to the axis of rotation of the tire.

6. In a pneumatic tire for a vehicle wheel having a tread portion and two sidewalls comprising elastomeric material which extend from the tread portion and terminate in beads which are adapted to be disposed in bead seats of a rigid rim and an annular reinforcing structure which is substantially inextensible under tire inflation pressure in both its circumferential and lateral direction reinforcing the tread portion, said sidewalls having cross-sectional shapes whose midline over substantially the whole length between the tread reinforcement and the bead are convex with respect to the interior of the tire under tire inflation pressure, each of said sidewalls having a bending stiffness, curvature and thickness whereby the sidewalls are constrained between their point of connection with the tread portion and said sidewalls and the sidewalls are placed under compressive stress under inflation and service conditions, the improvement wherein said tread portion extends axially outwardly as annular flanges beyond the connection zones between the tread and the sidewalls to form annular flanges and provide a tread width which is larger than the width of any other part of the tire, and said annular reinforcing structure extends outwardly from the points where the sidewalls connect with the tread into a substantial portion of the said flanges, whereby prop strains exerted by the sidewalls are exerted against said reinforcing structure at points spaced from edges thereof and the abiltiy of said reinforcing structure to withstand such strains without deformation is improved.

* * * * *

UNITED STATES PATENT AND TRADEMARK OFFICE
CERTIFICATE OF CORRECTION

PATENT NO. : 3,996,986
DATED : December 14, 1976
INVENTOR(S) : Giorgio Tangorra

It is certified that error appears in the above—identified patent and that said Letters Patent are hereby corrected as shown below:

Column 1, line 7, before "tread" insert --the--;

Column 2, line 35, change "Accordingly" to --According--;

Column 2, line 43, after "zone" insert --of--;

Column 3, line 22, change "an" to --and--;

Column 4, line 12, change "to" to --of--.

Signed and Sealed this

Twelfth Day of April 1977

[SEAL]

Attest:

RUTH C. MASON
*Attesting Officer*

C. MARSHALL DANN
*Commissioner of Patents and Trademarks*